Nov. 29, 1932.  H. FROMM  1,889,197

SHOCK ABSORBER FOR CARS

Filed Oct. 25, 1930  3 Sheets-Sheet 1

Herbert Fromm
INVENTOR

BY Victor J. Evans
ATTORNEY

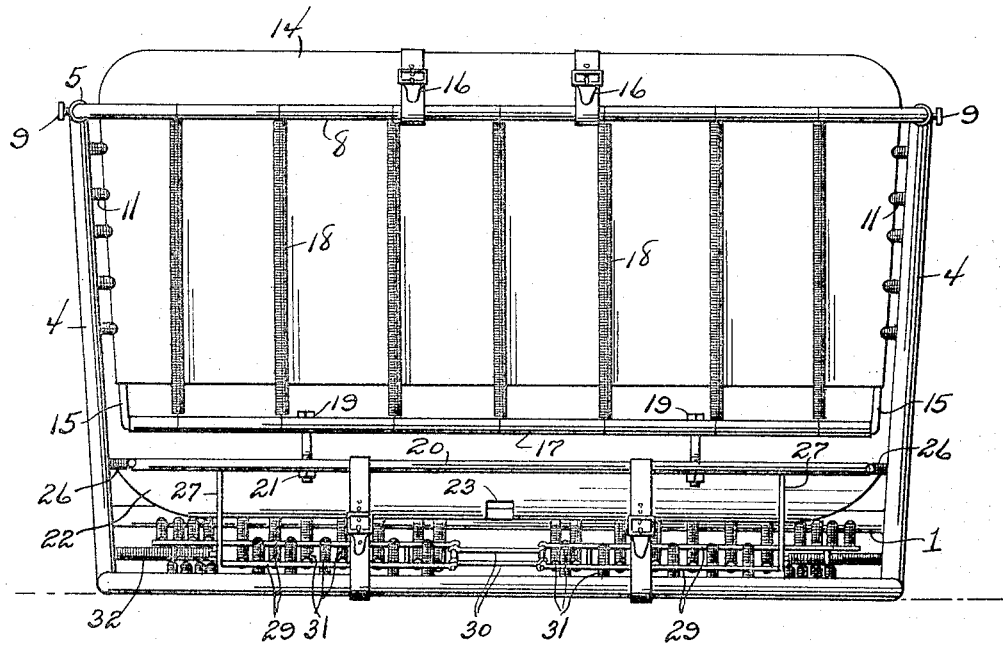
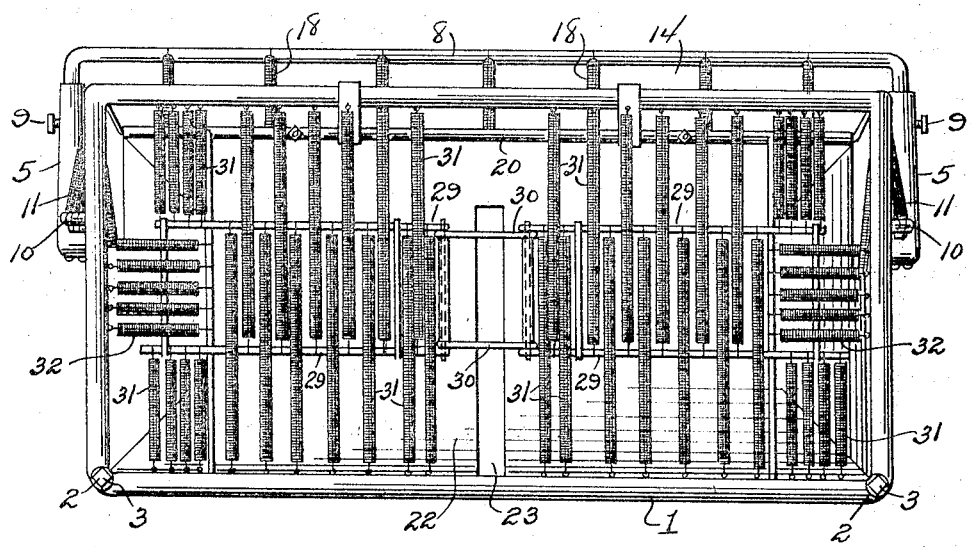

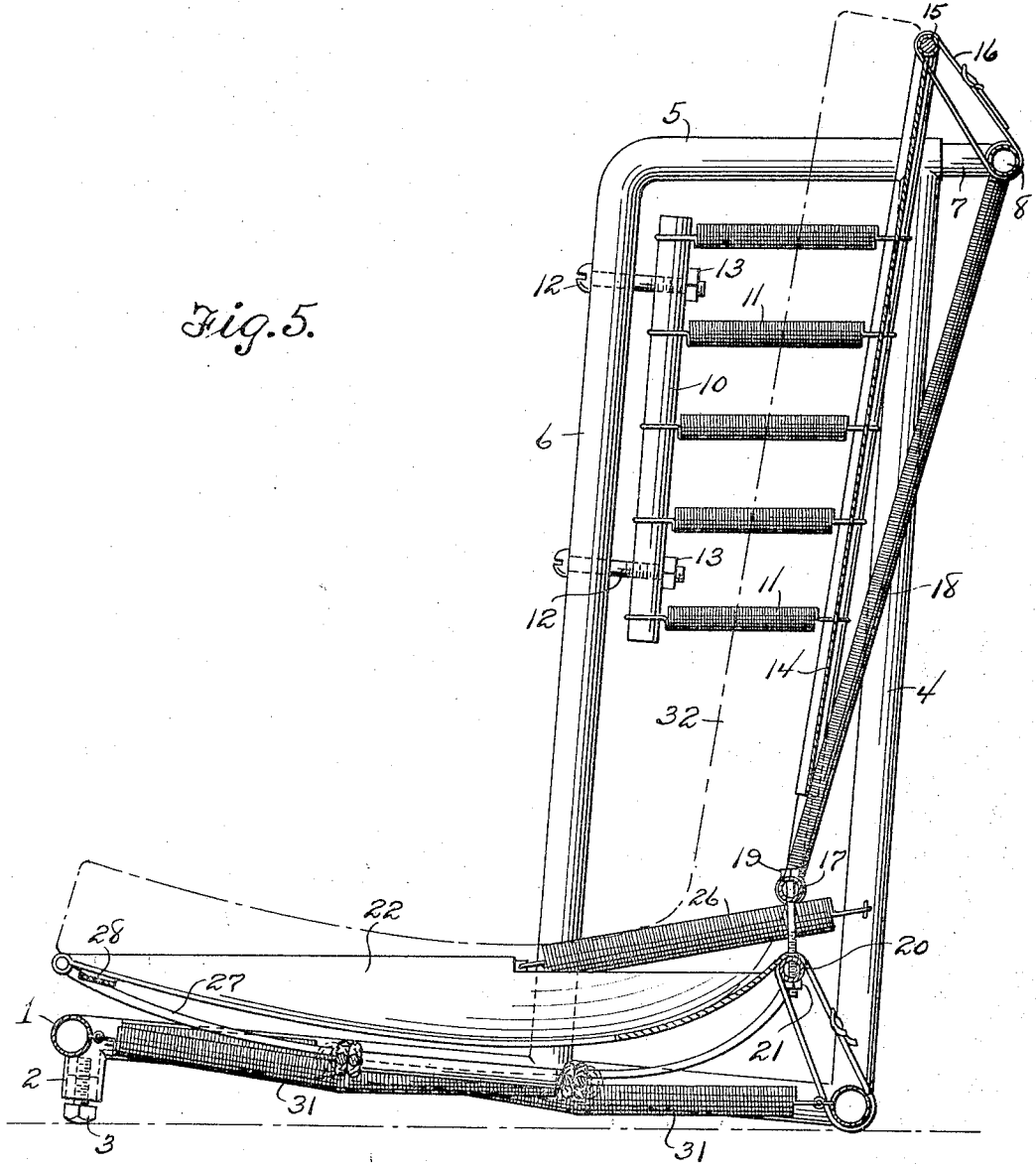

Patented Nov. 29, 1932

1,889,197

UNITED STATES PATENT OFFICE

HERBERT FROMM, OF HAMBURG, WISCONSIN

SHOCK ABSORBER FOR CARS

Application filed October 25, 1930. Serial No. 491,244.

This invention has reference to a shock absorber for the seats of motor and other vehicles, aircrafts, etc., the general object of the invention being to provide a plurality of expansion springs for supporting the seat and back thereof in such manner that all vibrations, shocks and the like are absorbed by the springs and thus not transmitted to the occupants thereof so that these may ride in greater comfort than is possible in the generally prevailing seats in which construction the common coil compression spring is used.

A further object is to improve the shock absorber construction for vehicles upon which I was granted U. S. Letters Patent No. 1,753,047 on April 1, 1930.

For a full and comprehensive understanding reference is to be had to the drawings which accompany this description and wherein there is illustrated a satisfactory embodiment of the invention reduced to practice, it being understood that such changes may be made as fall within the scope of what I claim.

In the drawings:

Figure 3 is a rear elevation thereof.

Figure 4 is a bottom plan view thereof.

Figure 5 is an enlarged sectional view approximately on the line 5—5 of Figure 1, the cushion being indicated by the dotted lines.

Figure 1:
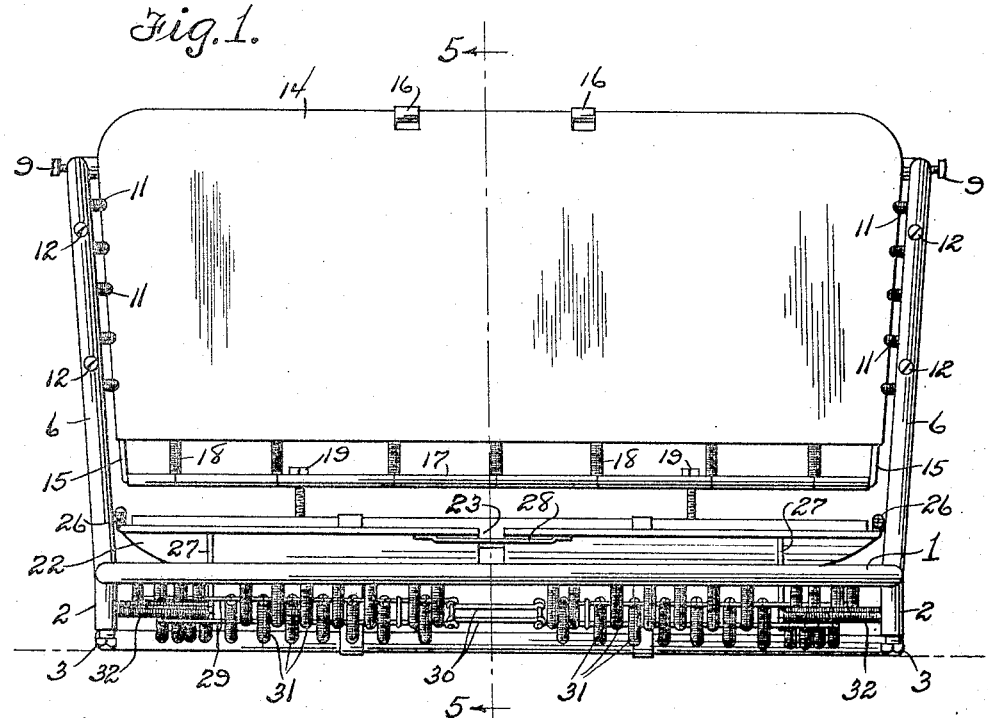
Figure 1 is a front elevation of the improvement, the cushion being removed.
Figure 2:
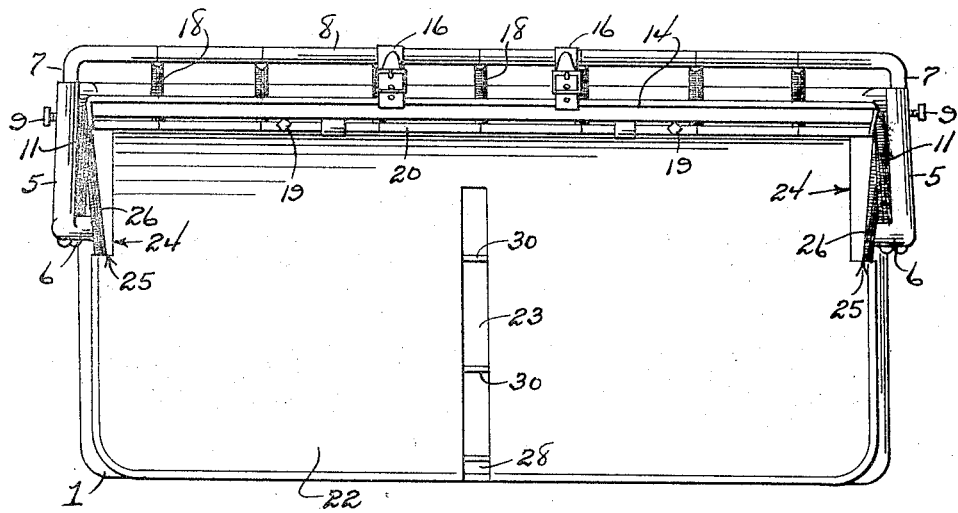
Figure 2 is a top plan view thereof.

The frame of the improvement may form a part of the vehicle, but in the showing of the drawings the said frame is constructed of tubular members. The substantially rectangular bottom 1 of the frame has at its front corners depending sockets 2 in which there are screwed or otherwise adjustably received the shanks of headed foot members 3, and these foot members retain the bottom of the frame at a desired angle, it being understood that the rear of the frame rests directly upon the support therefor. Arising from the rear corners of the bottom 1 there are the tubular sides 4 of the frame. The sides 4, at their upper ends are connected to tubular substantially horizontal arms 5 which merge into depending portions 6 that are connected to the sides of the bottom 1 and the elements 5 and 6 afford the sides of the frame. The members 5, at their juncture with the back members 4 slidably receive therein the offset or angle ends 7 of a substantially U-shaped back tube 8. There is passed through the tubular members 5 and brought into frictional contact with the arms 7 of the member 8 adjustable binding means 9, and whereby the upper element of the back 7 may be extended rearwardly with respect to the upright 4, thereby altering the angle formed at the junction of the back and the seat proper.

Disposed inwardly of each of the vertical members 6 of the sides and arranged at a suitable distance below the top elements 5 of the sides there are tubes 10 of a determined length, and these tubes have arranged therearound the coiled or eye ends of expansion springs 11. The tubes 10, of course, provide elements of the sides and they are adjustably connected to the side uprights 6 through the medium of bolts 12 which pass through the sides 6 and the tubes 10, the said bolts being engaged by nuts 13 which contact with the rear or inner faces of the members 10 for the purpose of regulating the tension of expansion springs 11.

The back plate of the improvement 14 is preferably in the nature of a coil spring net, or other material like leather, rubber fabric, wicker or metal sheeting, fastened to a supporting member or frame 15. The second or rear ends of the springs 11 are connected to the sides of the back plate 14.

The reinforcing elements 15 for the back plate 14 are preferably of a rectangular formation and are continuous, the upper corners of the said reinforcing member 15 being rounded to correspond with the upper corners of the back plate 14, and the back plate, in a line with the upper portion of the reinforcing member 15 is notched or cut-away at desired intervals for the reception of adjustable straps 16 which are also arranged around the upper back element 8 of the frame.

The side members of the reinforcing wire or rod 15 project a suitable distance beyond the lower edge of the back plate and the lower portion of the said reinforcing member passes through the ends of a tube 17. While I have stated that the reinforcing member 15 is continuous, the same preferably is constructed of two substantially U-shaped sections, the parallel arms of which being received in the upper beaded edge of the back plate 14 and in the tubular member 17 and secured thereto in any desired and preferred manner. The tube 17 has secured thereto the lower ends of coiled expansion springs 18 whose upper ends are connected to the adjustable back member 8 of the frame.

At desired, spaced intervals, there are passed through the tube 17 and the transverse tube 20 (to which are fastened the rear side of plate 22 and the rear ends of the rockers) the adjustable bolts 19. These bolts are engaged by nuts 21, whereby tube 20 is adjusted with respect to tube 17, and likewise whereby the tension of springs 18 may be regulated. When it is desirable to give to plates 22 and 14, namely to the bottom of the seat and to its back a partial freedom of movement with respect to each other, then bolts 19 may be replaced with a means of adjustment and support which is yieldable like straps, cables or chains. The tension of the springs 11 is regulated by the adjustment of the bolts 12 and the adjustable straps 16 determine the set distance between 14 and 8 or in other words the give in the back.

The tube 20 may pass through the beaded rear edge of the arched or concaved bottom plate 22 of the improvement and may be secured to the said edge of the bottom plate. The bottom plate, from its outer edge, is centrally slotted, as at 23, thereby dividing the plate into what may be termed two parts for a purpose which will presently be described and by reference to the drawings it will be noted that the sides, from the rear corners of the bottom plate 22 are notched, as at 24. The side and outer edge of the bottom plate, from the notches are rolled to receive therethrough a reinforcing rod or wire member and connected to the shoulders 25 provided at the inner edge of the notched portions 22 there are the ends of coil expansion springs 26 whose second and rear ends are fastened to the back uprights 4 of the frame.

Secured to the front of the bottom plate 22 and likewise to the rear thereof there are spaced arched rocker members 27, and preferably and as disclosed by the drawings the reinforcing rod for the beaded edges of the bottom plate does not pass through the slot or notch 23, so that the front end of the said bottom plate, at the said notched portion thereof, have the sections provided thereby connected through the medium of a yieldable metal strap 28. It is understood that when instead of metal, the bottom plate 22 is made of a yieldable material like leather or a moulded tire fabric 23, 24, 25, 26 and 28 can be eliminated and the reinforcing wire member at 25 continues rearwardly and fastens directly to 20 (instead of with springs 26 to 4).

There are arranged slightly below the bottom portion 1 of the frame two spaced substantially rectangular members which I will refer to as saddles inasmuch as they provide supports for the rockers and likewise are held on the sides and ends of the base of the frame by expansion springs. The confronting ends of the saddle members 29 are connected together by links 30, and these links bridge the slot or opening 23 in the seat plate 22. The longitudinal members of the small rectangular frames or saddles have fastened thereon any desired number of oppositely coiled expansion springs 31, the said oppositely directed springs underlying the longitudinal members of the saddles to which they are not connected and the respective series of springs 31 have their ends connected to the front and to the rear of the bottom portion of the frame. The longitudinal members, adjacent to their ends, have secured thereon shorter expansion springs 31' which are oppositely directed from the said saddle members and are connected respectively to the front and to the rear of the bottom 1 of the frame. The rockers, at the portions thereof disposed between the sides of the members 29, have secured thereto coil expansion springs 32, and which springs have their outer ends secured to the sides of the bottom 1 of the frame. Preferably the arched members 27, which I have termed the rockers, are guided through sockets carried by the saddle members 29, and it is to be noted that these members 27 do not contact with the springs that are secured to the saddle members.

Arranged on the back and the seat of the improvement there is a cushion 33, indicated by the dotted lines in Figure 5 of the drawings.

From the above description when read in connection with the accompanying drawings it will be noted that the seat does not contact with and, therefore, prevents the wear on the lower springs. The number of springs depends on the respective gage, thickness and flexibility of the springs and intended maximum load. The springs radiating and slanting downwardly from the center of the frame and being fastened to the lower rear portion of the frame act as a check against rebound as do the springs fastened horizontally to the back. These latter springs also serve to draw upon the upright springs of the back, thus giving the correct position to the seat and preventing the same from tilting forward through the action of the upright set of adjustable springs. The size and shape of the seat varies to accord with the space the same is to occupy in the vehicle. By providing the bottom plate with the central slot persons of different weights resting upon the respective sides or sections of the said plate will receive proper cushioning effect and the springs necessarily absorb all shock to which the seat is subjected. By tightening the rear springs more to one side than the other individual riding tension is achieved and the springs connected with the adjustable back of the frame serve as snubbers and the farthest forward movement of the said back is determined by the adjustable straps 16. The side arms as heretofore stated are adjusted with respect to the back and these sides are preferably rounded to their connection with the back proper to add to the convenience of the occupant of the seat and likewise to serve as a safety guard. The adjustable straps which pass over 20 and around the lower rear channel serve as snubbers. Their position may be altered so as to pass through the front part of 22 over its reinforcing rod and around the section of 1 lying directly beneath.

It is thought that the construction and advantages thereof will be understood and appreciated by those skilled in the art to which such invention relates without further detailed description.

Having described the invention, I claim:

1. A shock absorbing seat, including a frame that comprises a bottom and a back, saddle members connected by links arranged in the bottom, a number of springs connecting the saddle members to the sides and ends of the bottom, a bottom seat plate having rockers resting on and loosely secured to the saddle members, and springs connecting the bottom plate to the back of the frame.

2. A shock absorbing seat, including a frame that comprises a bottom and a back, saddle members connected by links arranged in the bottom, a number of springs connecting the saddle members to the sides and ends of the bottom, a bottom seat plate having rockers resting on and loosely secured to the saddle members, springs connecting the seat plate with the lower portion of the back and springs connecting the seat plate with the top of the back.

3. A shock absorbing seat, including a frame that comprises a bottom and a back, saddle members connected by links arranged in the bottom, a number of springs connecting the saddle members to the sides and ends of the bottom, a bottom seat plate having rockers resting on and loosely secured to the saddle members, springs connecting the seat plate with the lower portion of the back and springs connecting the seat plate with the top of the back and adjusting means between the last mentioned springs and the rear of the bottom.

4. A shock absorbing seat, including a frame that comprises a bottom and a back, saddle members connected by links arranged in the bottom, a number of springs connecting the saddle members to the sides and ends of the bottom, a bottom seat plate having rockers resting on and loosely secured to the saddle members, springs connecting the seat plate with the lower portion of the back and springs connecting the seat plate with the top of the back and adjusting means between the last mentioned springs and the rear of the bottom, adjusting means for the last mentioned springs, and adjustable straps connecting the rear of the bottom plate with the rear of the bottom frame.

5. A shock absorbing seat, including a frame comprising a bottom and back, adjustable feet for the front corners of the bottom, a pair of substantially rectangular members comprising saddles having their confronting ends connected by links arranged in the bottom frame, a plurality of springs connected with the ends and with the sides of the bottom frame, another plurality of springs connected with the respective longitudinal portions of the saddle members directed oppositely therefrom to underlie the said saddle members and connected to the respective front and rear of the bottom frame, a bottom plate member which is centrally slotted, means bridging the slot at the outer end of the bottom, rockers on the bottom plate resting on and loosely secured to the saddle members and spaced away from the springs, springs connecting the bottom plate to the lower portion of the back of the frame, springs connected to the upper portion of the back of the frame and having adjustable means securing the same to the rear of the bottom plate and adjustable straps arranged around the rear of the bottom plate and to the rear of the bottom frame.

6. A shock absorbing seat including a tubular frame that comprises a bottom, sides and a back, a pair of spaced saddle members arranged in the bottom of the frame and having links connecting each pair together, a series of coil expansion springs secured to the saddle members and to the sides and ends of the bottom frame, an arched back having its edges beaded and reinforcing elements passing through the beads and having its sides from its rear end notched longitudinally and being centrally slotted from its front, a strap secured to and bridging the slot and the bottom end of the bottom plate, arched members comprising rockers secured to the bottom plate, resting on and loosely connected to the saddle members, expansion springs connected to the notched portions of the bottom plate and to the rear of the frame, a back plate having its top and ends beaded and reinforcing elements passing through the beads and extending downwardly and inwardly from the lower edge of the back plate, a tubular member receiving the said ends of the reinforcing elements therein, adjustable means securing the top to the reinforcing elements of the bottom plate, springs secured between the tubing and the top of the back frame, adjustable straps connecting the rear of the bottom plate to the rear of the bottom frame, and adjustable straps connecting the top of the back plate with the top of the back frame.

7. A shock absorbing seat including a tubular frame that comprises a bottom, sides and a back, a pair of spaced saddle members arranged in the bottom of the frame and having links connecting each pair together, a series of coil expansion springs secured to the saddle members and to the sides and ends of the bottom frame, an arched back having its edges beaded and reinforcing elements passing through the beads and having its sides from its rear end notched longitudinally and being centrally slotted from its front, a strap secured to and bridging the slot and the bottom end of the bottom plate, arched members comprising rockers secured to the bottom plate, resting on and loosely connected to the saddle members, expansion springs connected to the notched portions of the bottom plate and to the rear of the frame, a back plate having its top and ends beaded and reinforcing elements passing through the beads and extending downwardly and inwardly from the lower edge of the back plate, a tubular member receiving the said ends of the reinforcing elements therein, adjustable means securing the top to the reinforcing elements of the bottom plate, springs secured between the tubing and the top of the back frame, adjustable straps connecting the rear of the bottom plate to the rear of the bottom frame and adjustable straps connecting the top of the back plate with the top of the back frame, adjustable means secured to the outer members of the side members and expansion springs secured to said members and to the edges of the back plate.

8. A shock absorbing seat including a tubular frame that comprises a bottom, sides and a back, a pair of spaced saddle members arranged in the bottom of the frame and having links connecting each pair together, a series of coil expansion springs secured to the saddle members and to the sides and ends of the bottom frame, an arched back having its edges beaded and reinforcing elements passing through the beads and having its sides from its rear end notched longitudinally and being centrally slotted from its front, a strap secured to and bridging the slot and the bottom end of the bottom plate, arched members comprising rockers secured to the bottom plate, resting on and loosely connected to the saddle members, expansion springs connected to the notched portions of the bottom plate and to the rear of the frame, a back plate having its top and ends beaded and reinforcing elements passing through the beads and extending downwardly and inwardly from the lower edge of the back plate, a tubular member receiving the said ends of the reinforcing elements therein, adjustable means securing the top to the reinforcing elements of the bottom plate, springs secured between the tubing and the top of the back frame, adjustable straps connecting the rear of the bottom plate to the rear of the bottom frame and adjustable straps connecting the top of the back plate with the top of the back frame, adjustable means secured to the outer members of the side members and expansion springs secured to said members and to the edges of the back plate, a substantially U-shaped tubular member having its ends received through the tubular top of the side frames, and around which member the upper adjustable straps are trained.

In testimony whereof I affix my signature.

HERBERT FROMM.